United States Patent
Kumai

[11] Patent Number: 5,898,398
[45] Date of Patent: Apr. 27, 1999

[54] REMOTE CONTROL DEVICE AND REMOTE CONTROL METHOD

[75] Inventor: Hisao Kumai, Tokorozawa, Japan

[73] Assignee: Casio Computer Co., Ltd., Tokyo, Japan

[21] Appl. No.: 08/894,723

[22] PCT Filed: Dec. 16, 1996

[86] PCT No.: PCT/JP96/03663

§ 371 Date: Aug. 11, 1997

§ 102(e) Date: Aug. 11, 1997

[87] PCT Pub. No.: WO97/23960

PCT Pub. Date: Jul. 3, 1997

[30] Foreign Application Priority Data

Dec. 22, 1995 [JP] Japan .................. 7-335367

[51] Int. Cl.⁶ .................................................. G08C 19/12
[52] U.S. Cl. .............. 341/176; 340/825.22; 340/825.79; 348/734; 455/186.1
[58] Field of Search ................. 340/825.22, 825.25, 340/825.69, 825.72; 341/176; 348/734; 345/158; 455/186.1, 186.2

[56] References Cited

U.S. PATENT DOCUMENTS 4,802,114  1/1989  Sogame .................. 340/825.72
5,255,313  10/1993 Darbee .
5,260,788  11/1993 Takano et al. .................. 358/142
5,390,027  2/1995  Henmi et al. .................. 358/335
5,455,570  10/1995 Cook et al. .................. 340/825.72
5,526,127  6/1996  Yonetani et al. .................. 358/335
5,572,194  11/1996 Shiota .................. 340/825.25
5,654,714  8/1997  Takahashi et al. .................. 341/176

FOREIGN PATENT DOCUMENTS 0 328 773    8/1989  European Pat. Off. .
0 643 500 A1 3/1995  European Pat. Off. .
WO 87/06416 10/1987  WIPO .
WO 93/10642  5/1993  WIPO .

*Primary Examiner*—Brian Zimmerman
*Assistant Examiner*—Timothy Edwards, Jr.
*Attorney, Agent, or Firm*—Frishauf, Holtz, Goodman, Langer & Chick

[57] ABSTRACT

A remote control device has the function of receiving FM multiplex broadcasting, storing the television program data transmitted from a broadcasting station into a television program memory, and displaying the stored program data. In the television program memory, the broadcasting dates, channels, broadcasting start and end times, program names, and G codes are stored. When the user chooses the program the user wants to record from the displayed programs, the remote control code for reserving the selected program for recording will be transmitted to the videotape recorder, thereby making a reservation for recording.

15 Claims, 18 Drawing Sheets

| INFORMATION MEMORY 32 | | |
|---|---|---|
| PROGRAM NUMBER | PAGE NUMBER | INFORMATION |
| *Broadcasting Station 1* | | |
| | | |
| | | |
| *Broadcasting Station 2* | | |
| | | |
| | | |

FIG.10

| DATE | CHANNEL | START | END | NAME OF PROGRAM | REMOTE CONTROL CODE |
|---|---|---|---|---|---|

32b RESERVATION COMPLETE MEMORY

| DATE | CHANNEL | START TIME | END TIME | NAME OF PROGRAM | CHANGE PRESENT |
|---|---|---|---|---|---|
| | | | | | |
| ⋮ | ⋮ | ⋮ | ⋮ | ⋮ | ⋮ |
| | | | | | |

FIG.11B

TV PROGRAM RESERVATION MODE

| | |
|---|---|
| 11/12 (SUN) | 1CH |
| 19:00 ~ 19:20 | NHK NEWS |
| 19:20 ~ 20:00 | FAMILY QUIZ |
| 20:00 ~ 20:45 | ABC DRAMA |
| 20:45 ~ 21:00 | SOCCER |
| 21:00 ~ 22:30 | NHK SPECIAL |

FIG.13A

RESERVATION VERIFY MODE

| DATE | CH | TIME | TITLE |
|---|---|---|---|
| 11/16 | 1 | 19:00 ~ 20:00 | NEWS |
| 11/07 | 8 | 20:00 ~ 21:00 | CDE DRAMA |
| 11/07 | 6 | 21:00 ~ 22:00 | FGH DRAMA |
| 11/09 | 10 | 19:00 ~ 21:00 | SOCCER |
| 11/10 | 4 | 20:00 ~ 22:00 | MOVIES |

FIG.13B 5,898,398

REMOTE CONTROL DEVICE AND REMOTE CONTROL METHOD

TECHNICAL FIELD

This invention relates to a remote control device for and a remote control method of controlling such devices as videotape recorders or television sets.

BACKGROUND ART

To make reservations for recording on a videotape recorder, it has been necessary for the user to check a program table for the broadcasting date, channel, day of the week, and broadcasting start and end times of the program the user wants to record, and enter those pieces of information by operating the keys on the remote control of the videotape recorder. Therefore, the input operation has been troublesome, and everybody has not been able to enter the data easily. Even a person skilled at operating the machine has sometime entered the data erroneously and found later that the desired program has not been recorded.

To overcome this problem, a method of making recording reservations easily using G codes has been used widely. A G code is a code obtained by encoding a channel, date, time, and duration and compressing the coded data as shown in, for example WO90/07844. With the method, the user checks a program table for the G code for the program the user wants to record, enters the G code by operating the numerical keys on the remote control, and transfers it to the videotape recorder. Then, the channel, date, day of the week, start and end times are automatically set, so the user will make fewer mistakes in input operation and reduce the number of failures in making reservations for recording.

With the method of making reservations for programs using G codes, however, the user has to enter a G code in many figures, seeing the program table, by operating the small keys on the remote control device, which makes the operation troublesome. Even if the user enters only one figure in the number erroneously, an error will result, so the user has to operate the keys again correctly. Alternatively, a different program corresponding to the wrong G code will be registered, so the user has to verify the reserved result. It is quite a burden to enter the G code correctly by operating the keys on the remote control at hand, seeing the G codes printed in small type on the program table in a newspaper. Even a person skilled in key operation may make a mistake. The conventional remote control systems have not been easy to use for the aged who are unaccustomed to operating video apparatus.

In recent days, FM broadcast has been multiplexed with the titles of musical compositions, weather forecast, traffic information, news, etc. and then the multiplexed data is broadcast, as disclosed in, for example, Jpn. Pat. Appln. KOKAI Publication No. 6-311060. It can be considered that other various types of information are transmitted through the FM multiplex broadcasting system.

DISCLOSURE OF INVENTION

The object of the present invention is to provide a remote control device and remote control method which enable program reservations through simple operation and a storage medium that stores a remote control program.

With a remote control device and remote control method according to the present invention, when a plurality of program data and the remote control codes for these data are received and stored in storage means and a desired program data is specified from the plurality of program data stored, the remote control code for the specified program data is transmitted, which eliminates troublesome key operations and enables anybody to easily reserve programs on a videotape recorder or the like.

With another remote control device and remote control method according to the present invention, when a plurality of program data including program start time data are received and stored and a desired program data is specified from the stored program data, a remote control code is created on the basis of the program data on the specified program and the remote control code is transmitted at the program start time, which makes program reservation easy.

BRIEF DESCRIPTION OF DRAWINGS

FIG. 10 shows the structure of the information memory 32;

FIG. 11A shows the structure of the television program data memory 32a;

FIG. 11B shows the structure of the reservation complete memory 32b;

FIG. 13A illustrates a representation of the TV program reservation mode;

FIG. 13B illustrates a representation of the reservation verify mode;

BEST MODE OF CARRYING OUT THE INVENTION

Figure 1:
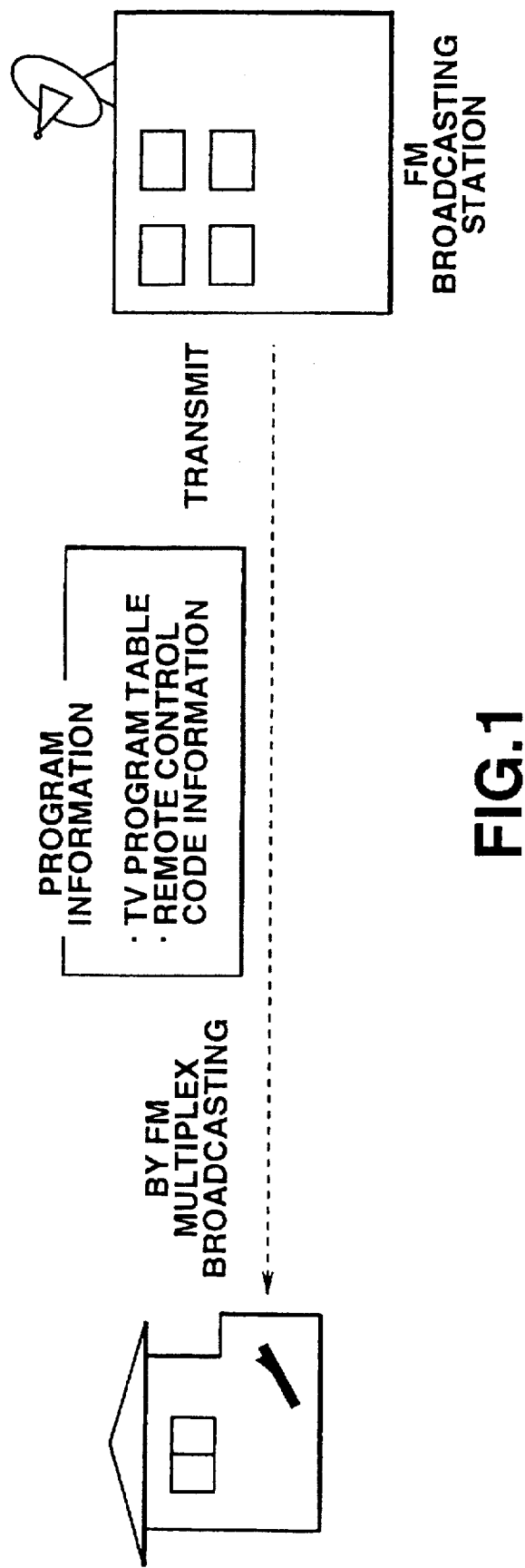
FIG. 1 is an explanatory diagram of an FM multiplex broadcasting system that transmits television program data.

Hereinafter, referring to the accompanying drawings, embodiments of the present invention will be explained. FIG. 1 is an explanatory diagram of an FM multiplex broadcasting system, which a prerequisite for the present invention.

In the broadcasting system, the television program data, including channels, program names, broadcasting dates, broadcasting start and end times, and G codes, are multiplexed with ordinary FM broadcasting radiowaves and transmitted. The signal thus transmitted is used to control, for example, a videotape recorder in each home. The remote control device of the present invention has the function of receiving FM multiplex broadcast and is capable of not only storing the received television program data in a memory but also displaying the stored television program data. The remote control device is designed to transmit the G code of the program when the user has chosen the program the user wants to record from the displayed programs.

Figure 2:
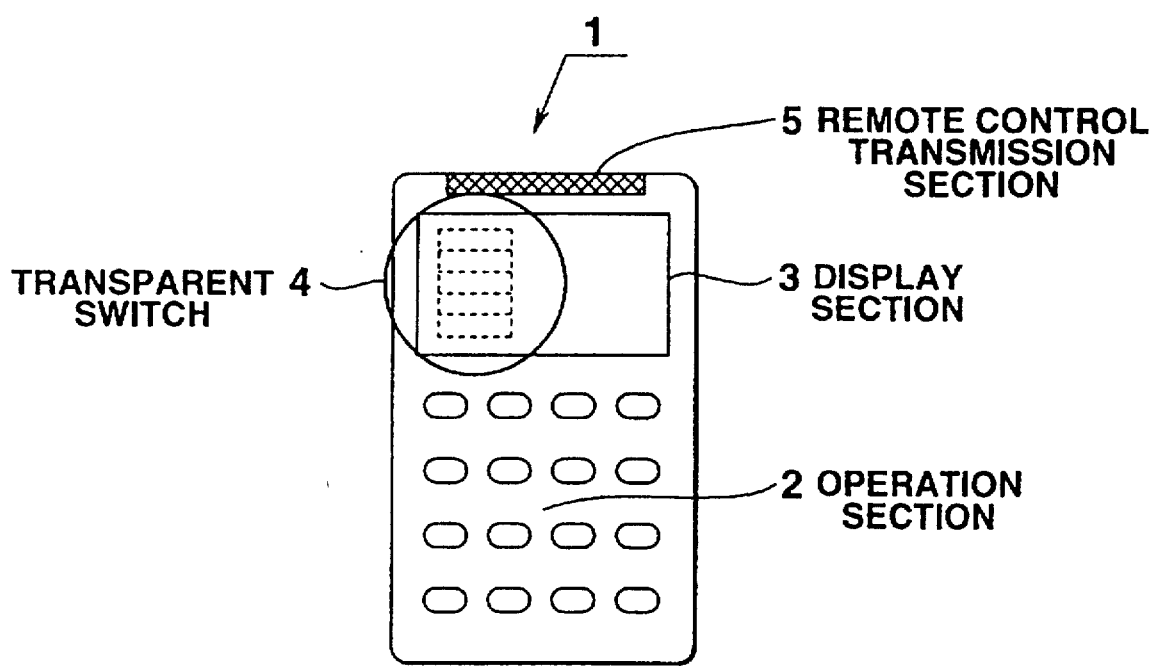
FIG. 2 is an external view of a remote control device according to a first embodiment of the present invention.

FIG. 2 is an external view of a remote control device according to a first embodiment of the present invention. In the figure, an operation section 2 is provided with numerical keys for number 1 to number 12 for choosing a television channel, a tuning key for choosing an FM broadcasting station, a top, bottom, right, and left cursor keys, a transfer key for transferring a remote control code, etc., all of which are not shown here though.

Figure 3:
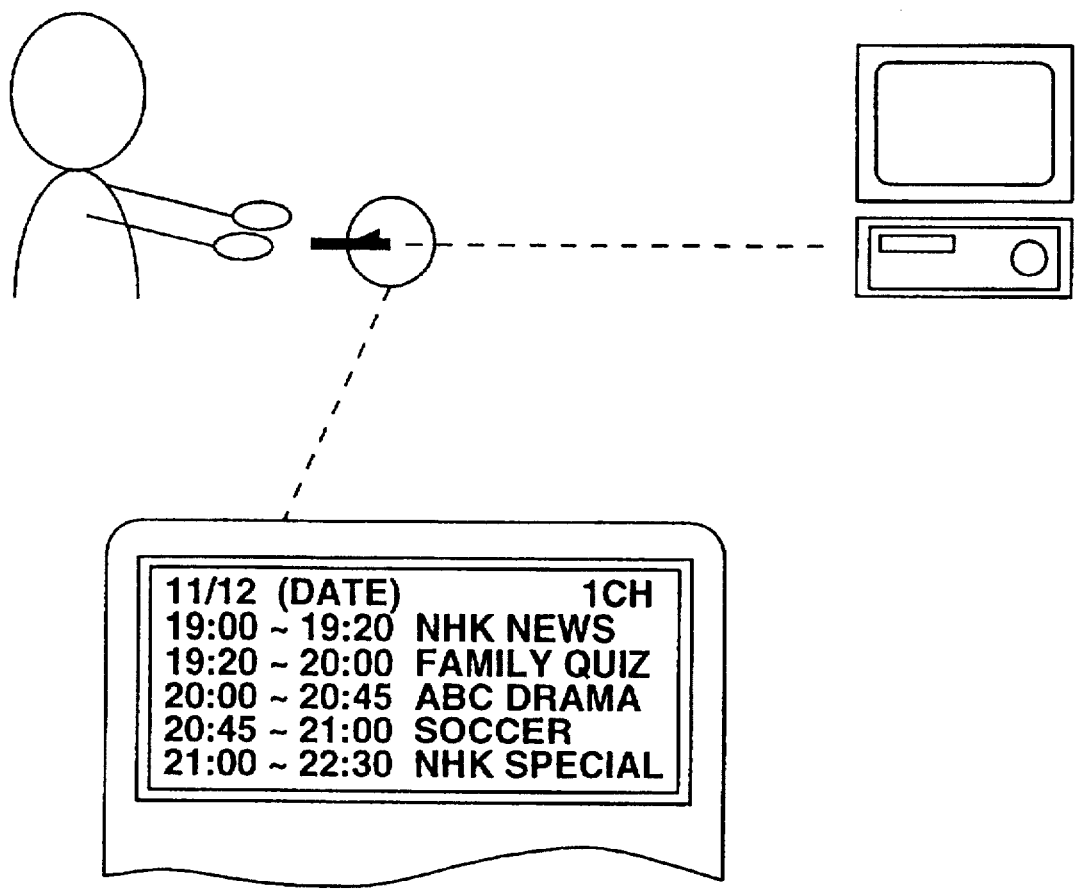
FIG. 3 is an explanatory diagram of television program data appearing on the remote control device.

A display section 3 includes a liquid-crystal display device and displays the received program data. On the display section 3, five programs appear as shown in FIG. 3. In the places where the five programs appear, transparent switches 4 are provided as shown in FIG. 2. The program the user wants can be chosen by turning on the transparent switch 4 in the corresponding position. Then, when the transfer key is turned on, the G code of the program chosen by the user is transmitted from a remote control transmission section 5 to the videotape recorder, which makes a reservation for recording.

The circuit configuration of the remote control device 1 will be described by reference to FIG. 4. The FM radiowaves received by an antenna 11 are outputted to FM tuners 12A and 12B. The FM tuner 12A is a tuner for mainly receiving an audio signal and the FM tuner 12B is a tuner for receiving the data multiplexed with the audio signal. An FM demodulator 13A demodulates the signal tuned at the FM tuner 12A and outputs the demodulated signal to a stereo demodulator 14. The stereo demodulator 14 demodulates an L signal and an R signal from the L+R signal and the L−R signal outputted from the FM demodulator 13A, respectively, and outputs the R and L signals to a right and left headphones 16R and 16L, respectively, via an audio amplifier 15.

An FM demodulator 13B FM-demodulates the signal outputted from the FM tuner 12B and outputs the demodulated signal to an L-MSK demodulator 17. The L-MSK demodulator 17 demodulates the signal outputted from the FM demodulator 13B by L-MSK (Level controlled Minimum Shift Keying) and outputs the demodulated signal to an error correction decoder 18. The error correction decoder 18 corrects errors in the input signal and outputs the corrected signal to a control section 19.

When receiving an FM broadcast, the control section 19 instructs a tuning control circuit 21 to change the reception channel according to the operation of the tuning key on a key input section 20 (the operation section 2). The control section 19 executes the FM radio reception process, FM multiplex information reception process, TV program reservation mode process, etc., which will be explained later, according to the control program stored in a ROM 22, and stores the received television program data into a RAM 23. Furthermore, the control section 19 displays the program data stored in the RAM 23 on a display section 24 in the TV program reservation mode and causes a transmission section 25 (the remote control transmission section 5) to transmit the G code of the television program chosen by the user to the videotape recorder or the like. Still furthermore, the control section 19 causes a buzzer 28 to go off as the need arises.

In an EEPROM 26, the information required to be stored even after the device is turned off, for example, the last-received channel at the FM tuner 13A, is stored. In a RAM 27, data other than the television program data are stored.

Figure 5:
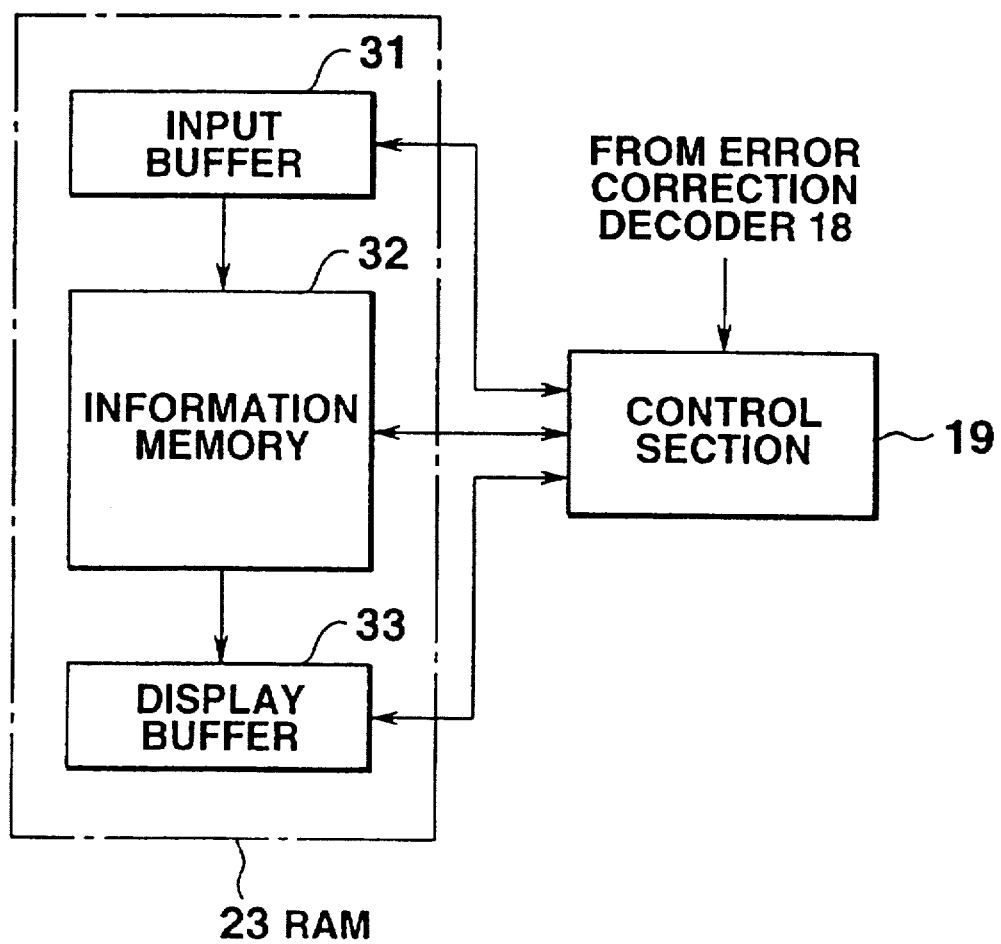
FIG. 5 shows the structure of the RAM 23.

The RAM 23 is composed of an input buffer 31, an information memory 32, and a display buffer 33 as shown in FIG. 5. Receiving the multiplex information consisting of binary data, 1s and 0s, from the error correction decoder 18, the control section 19 writes it into the input buffer 31 and then converts the binary data into character data and writes the converted data into the information memory 32. Then, when the user operates the cursor keys to request the display of the next multiplex information, the control section reads the next multiplex information item in the information memory 32 indicated by the pointer (not shown), transfers it to the display buffer 33, and enables the next multiplex information to appear on the display section 24.

The operation of the embodiment thus constructed will be explained roughly by reference to the flowchart of FIG. 6.

When the power on key is operated (step S1 in FIG. 6), the control section 19 reads out the last-received channel stored in the EEPROM 25 and sets the reception channel of the FM tuner 12A to the readout channel via the tuning control circuit 21 (step S2). Then, the set channel is received (step S3). In the following step S4, it is determined whether or not any key input operation has been done. If a key operation has been done, the process corresponding to the operated key will be executed.

When the judgment at step S4 has shown that the operated key is the tuning key for changing the reception frequency, the FM radio reception process at step S5 will be executed.

Figure 7:
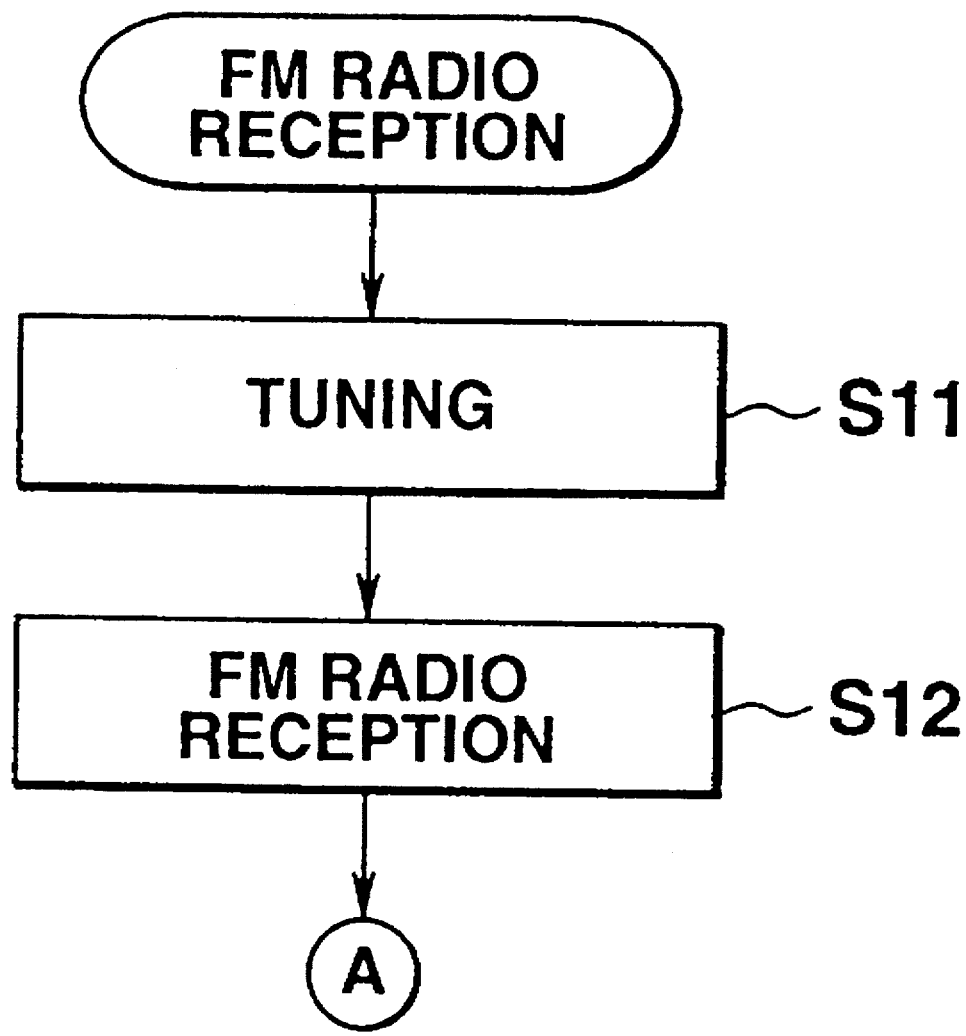
FIG. 7 is a flowchart for the FM radio reception process.

FIG. 7 is a flowchart for the FM radio reception process. When the operated key is the tuning key for raising the reception frequency, the control section 19 will instruct the tuning control circuit 21 to raise the reception frequency of the FM tuner 12A. When the operated key is the tuning key for lowering the reception frequency, the control section will instruct the tuning control circuit 21 to lower the reception frequency of the FM tuner 12A (step S11 in FIG. 7). Then, the channel with the changed frequency will be received (step S12).

When the determination at step S4 has shown that the operated key is the information key, the FM multiplex information reception process at step S6 will be executed.

Figure 8:
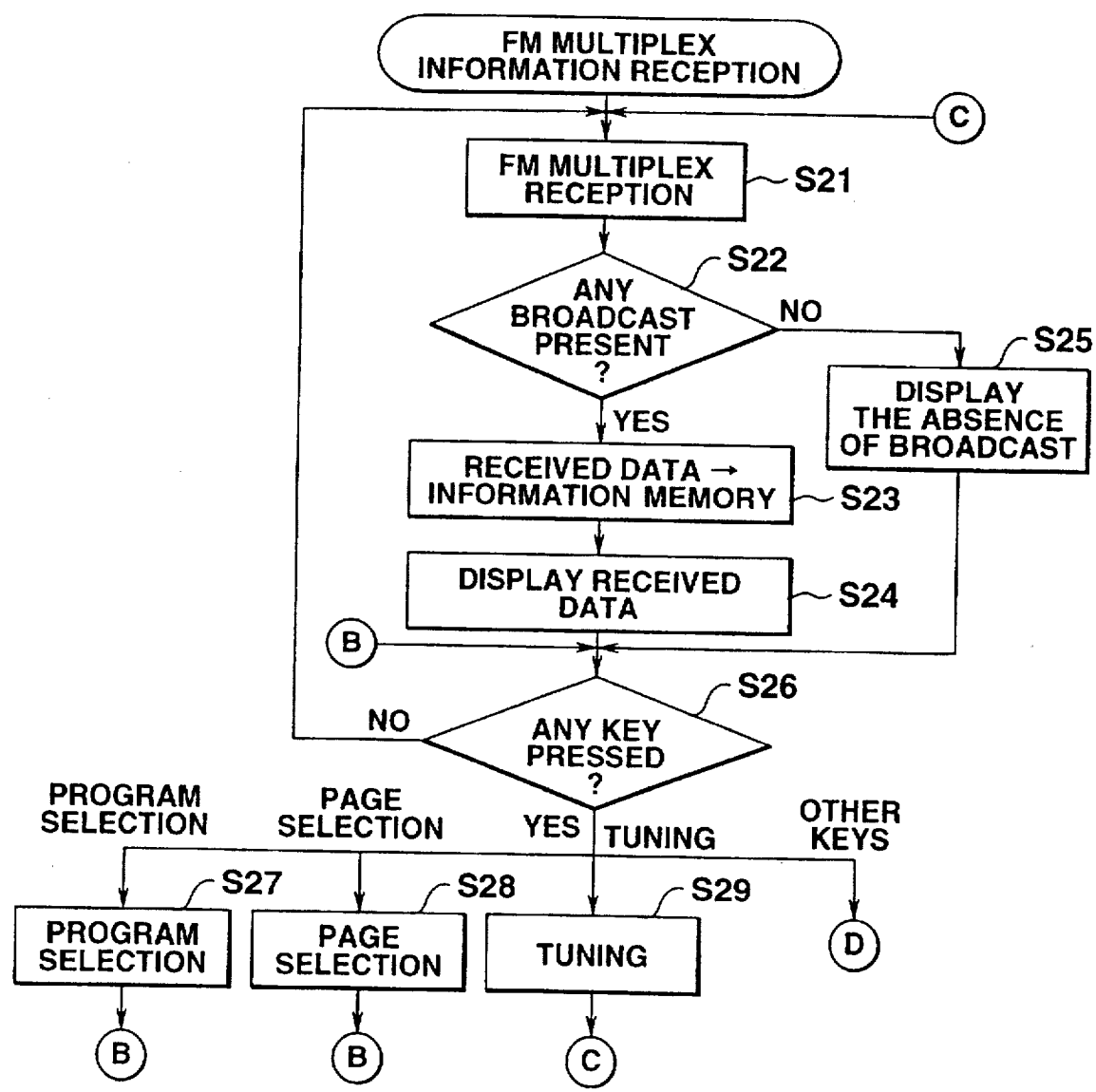
FIG. 8 is a flowchart for the FM multiplex information reception process.

FIG. 8 is a flowchart for the FM multiplex information reception process. First, the control section 19 instructs the FM tuner 12B via the tuning control circuit 21 to receive the specified channel and to take in the multiplex information being broadcast on the channel. This enables the FM tuner 12B to receive the broadcasting radiowave on the specified channel and the FM demodulator 13B FM-demodulates the signal received at the FM tuner 12B and separates the multiplex information contained in the demodulated signal. The separated multiplex information is outputted to the L-MSK demodulator 17, which then demodulates it by L-MSK. Then, the L-MSK-demodulated signal undergoes the error correction process at the error correction decoder 18 and then the resulting signal is outputted to the control section 19 (step S21 in FIG. 8).

Next, on the basis of whether the broadcasting radiowave has been received correctly, it is determined whether or not broadcasting is now being done on the specified channel (step S22).

When the determination at step S22 has shown that broadcasting is now being done on the specified channel, control will proceed to step S23, where the received data is stored in the information memory 32 of the RAM 23. Then, the received data is allowed to appear on the display section 24 (step S24).

Figure 9:
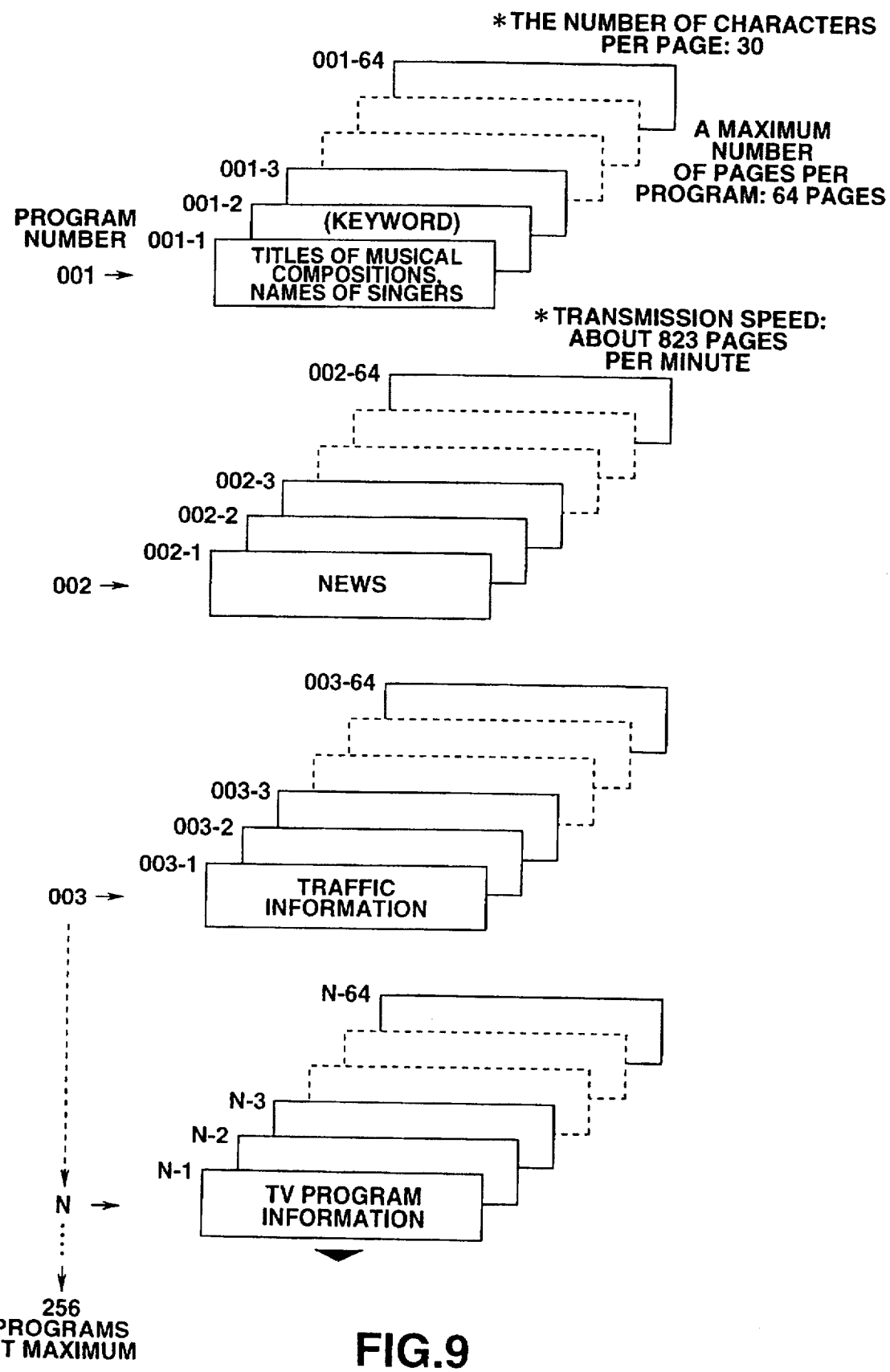
FIG. 9 is an explanatory diagram of the program information transmitted from the broadcasting station.

Here, the multiplex information stored in the information memory 32 will be described by reference to FIG. 9. The multiplex information items, including the titles of musical compositions, the names of singers, news, traffic information, and TV program information, are multiplexed with the broadcasting radiowave and the multiplexed signal is transmitted from the broadcasting station. The transmission speed of the multiplex information is about 623 pages per minute (30 characters per page).

The remote control device 1 receives those pieces of information and stores them in the information memory 32. The information memory 32 in the remote control device 1 of the embodiment is provided with a storage area that stores information in order of program number and page number on a broadcasting station basis as shown in FIG. 10 and is capable of storing a maximum of 256 programs of data for each broadcasting station, one program containing 64 pages of data.

The information memory 32 is provided with a television program memory 32a composed of a plurality of storage areas that store TV program information items, including the broadcasting dates on which the individual programs are transmitted from the broadcasting stations, channels, broadcasting start and end times, program names, and G codes, as shown in FIG. 11A.

The information memory 32 is further provided with a reservation complete memory 32b which stores the television program data that the user has selected by operating the transparent switch 4 with the television program data appearing on the display section 24. In the reservation complete memory 32b, the broadcasting dates, channels, broadcasting start and end times, program names, and one-bit information indicating whether or not the contents of the program have been changed.

The user can verify which program has been reserved for recording by displaying the program information items stored in the reservation complete memory 32b.

In FIG. 8, when in the determination at step S22, the radiowave on the specified channel cannot be received and it has been determined that no broadcasting is now being done on the channel, control will proceed to step S25, where the fact that no broadcasting is now being done on the channel will be displayed.

Following step S24 or S25, it is determined whether or not any key operation has been carried out (S26). When the up and down cursors have been operated to select a program, the pointer is updated and the next multiplex information in the information memory 32 is read out, the multiplex information is transferred to the display buffer 33, the multiplex information in the display buffer 33 is displayed on the display section 24 (step S27), and then control is returned to step S26.

When the right and left cursor keys are operated to choose a page, the information in the page following the information in a maximum of 64 pages of a program stored in the information memory 32 is read out and transferred to the display buffer 33 as in the program selection described above. After the display buffer displays the information on the display section 24, control returns to step S26 (step S28).

When the tuning key is operated to change the channel, control will proceed to step S29, where the reception channel will be set to the frequency of the next channel, and thereafter control will be returned to step S21.

When it has been determined that the operated key is a key other than the up and down cursor keys, right and left cursor keys, and tuning keys, it means that the information key, the television program reservation key or the like has been operated, so control will return to step S4 and later in FIG. 6.

Figure 6:
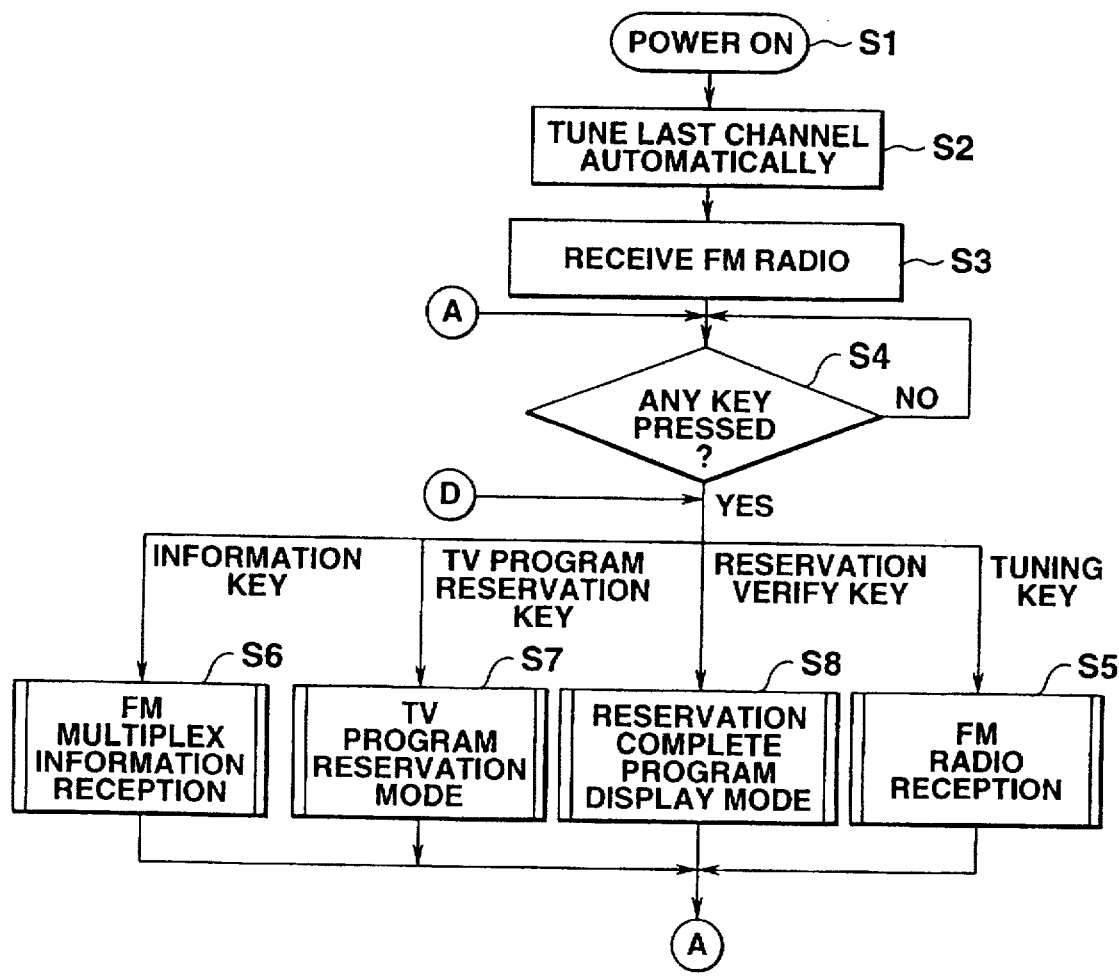
FIG. 6 is a flowchart for a rough operation of the first embodiment.

In FIG. 6, when it has been determined that the operated key is the TV program reservation key, the TV program reservation mode process at step S7 will be executed.

Hereinafter, the contents of the TV program reservation mode process will be described by reference to the flowchart of FIG. 12.

Figure 12:
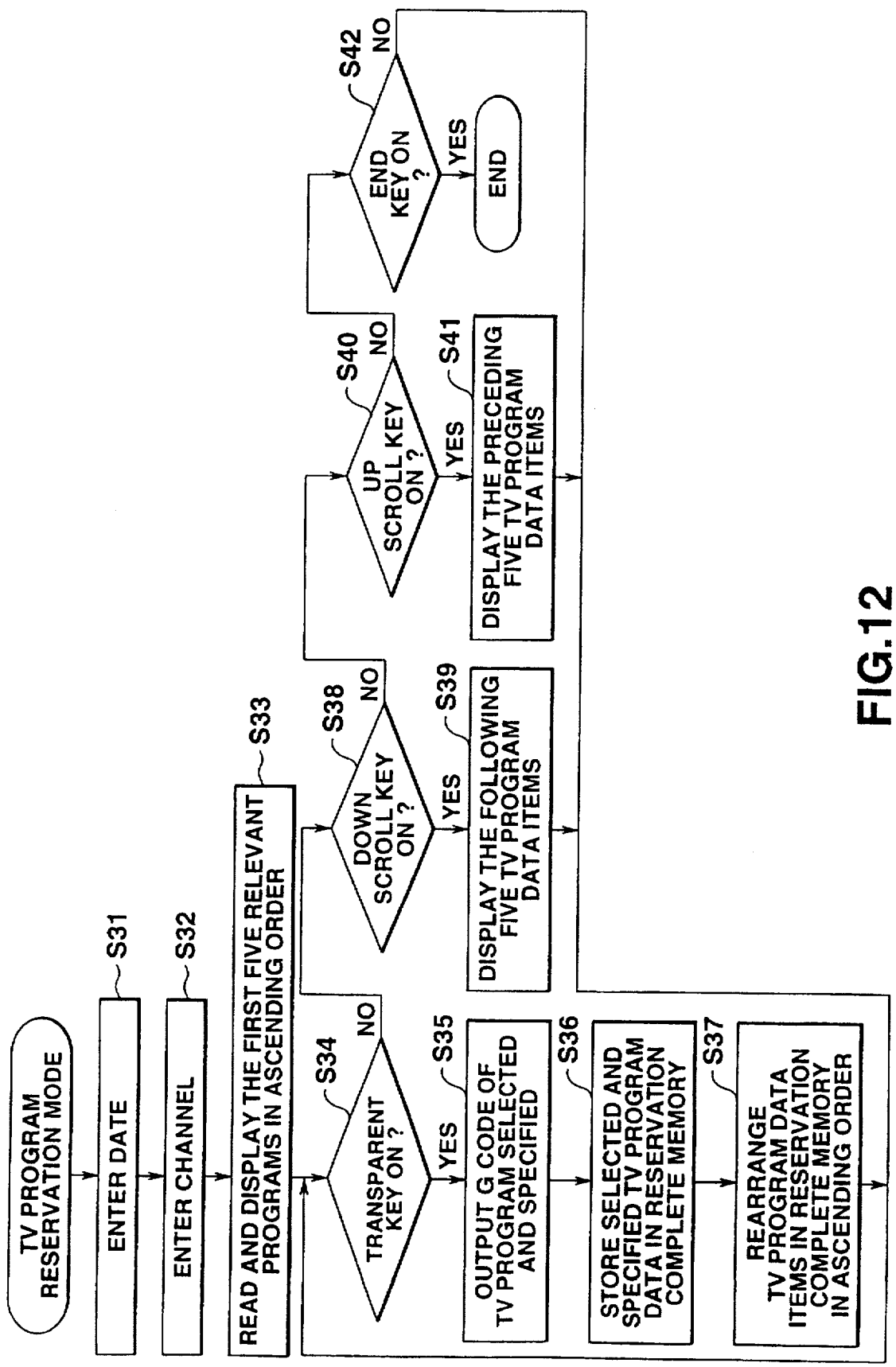
FIG. 12 is a flowchart for the TV program reservation mode process.

To reserve a TV program, the user first enters the date and channel by operating the numerical keys on the remote control device 1 (steps S31 and S32 in FIG. 12). When the date and channel have been entered, the control section 19 reads five television program data for the corresponding date and channel from the information memory 32 in ascending order (step S33).

FIG. 13A shows a representation in the TV program reservation mode. In the figure, the television program data on channel 1 on November 12 is shown in such a manner that five television program data are displayed in order of program number, that is, in order of broadcasting start time.

In FIG. 12, it is determined whether or not the transparent key (switch) in the display section 24 has been operated by the user (S34).

When the user has operated a transparent key 4 specifying any one of the five programs appearing on the display section 24, the G code stored in the information memory 32 so as to correspond to the television program name is read and outputted to the transmission section 25, which then transmits the G code to the videotape recorder (S35). Next, the television program data chosen and specified by the user is stored in the reservation complete memory 32b (S36). When a plurality of television program data are stored in the reservation complete memory 32b, the program data are rearranged in ascending order of start time (S37).

When at step S34, it is determined that the operated key is not the transparent key 4, control will proceed to step S38, where it will be determined whether or not the down scroll key has been operated.

When the operated key is the down scroll key, the next five television program data on the same channel on the same date stored in the information memory 32 will be read and displayed on the display section 24 (S39).

When the determination at step S38 has shown that the operated key is not the down scroll key, control will proceed to step S40, where it will be determined whether or not the operated key is the up scroll key. If the operated key is the up scroll key, the five television program data previous to the presently displayed programs on the same date and channel stored in the information memory 32 will be read and displayed on the display section 24 (step S41).

When the determination at step S40 has shown that the operated key is not the up cursor, control will proceed to step S42, where it will be determined whether or not the operated key is the end key. If the operated key is the end key, the process will be terminated. If the operated key is not the end key, control will return to step S34.

In the TV program reservation mode, when the user specifies the date and channel and operates the up and down cursor keys, this causes the television program data about the specified date and channel to be displayed in sequence. After the program the user wants to reserve for recording has been displayed, the user can choose it by turning on the transparent key 4 in the position in which the program the user wants to reserve appears. Turning on the transparent key 4 this way causes the G code of the selected program to be transmitted from the transmission section 25 to the videotape recorder.

Therefore, to reserve a television program for recording, the user need not enter the G code by operating the numerical keys on the remote control device 1, seeing the program table as in the past, and has only to choose the television program data appearing on the display section 24, so anybody can make reservations for recording easily.

In FIG. 6, when the operated key is the reservation verify key, the reservation complete program display mode process at step S8 will be executed. Hereinafter, the contents of the reservation complete program display mode (reservation verify mode) process will be described by reference to the flowchart of FIG. 14.

Figure 14:
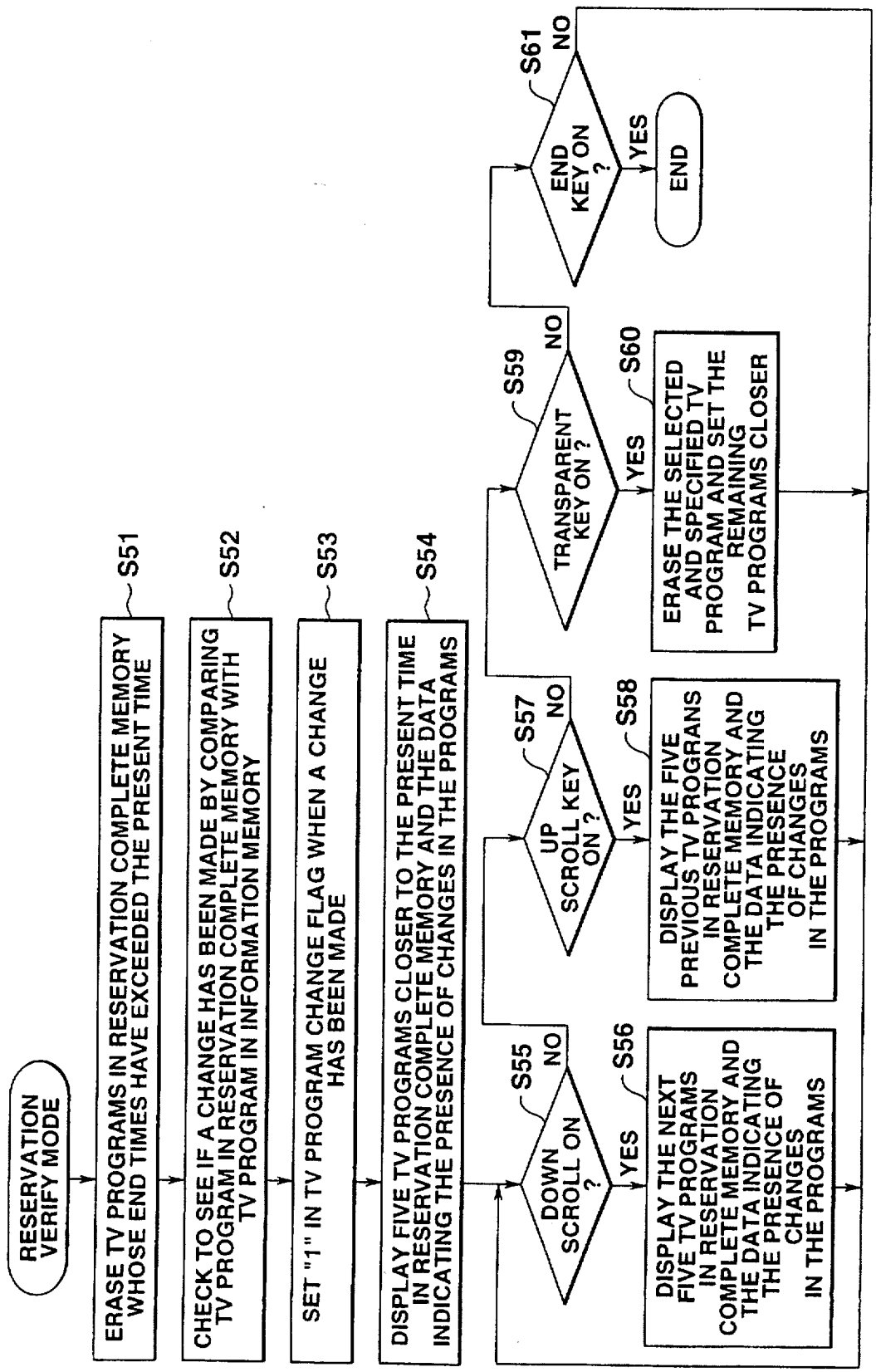
FIG. 14 is a flowchart for the reservation verify mode process.

First, of the television program data registered in the reservation complete memory 32b, those whose end times have exceeded the present time are erased (S51 in FIG. 14). Next, the television program data registered in the reservation complete memory 32b is compared with the television program data stored in the television program memory 32a in the information memory 32 to check to see if the contents of the program have been changed after the recording reservation (S52).

For instance, the television program corresponding to the broadcasting date and channel for the reserved program is retrieved from the television program memory 32a. When another television program has been stored in the same time slot, it will be determined that the broadcasting time and others of the program have been changed after the reservation operation. In that case, "1" is set in the corresponding change flag in the reservation complete memory 32b (S53). Furthermore, of the television program data registered in the reservation complete memory 32b, five programs whose broadcasting start times are closer to the present time are searched for. Then, the television program data for those programs and the data indicating whether or not the contents of the programs have been changed are displayed (S54).

FIG. 13B illustrates a representation in the reservation verify mode. As shown in the figure, when the mode is switched to the reservation verify mode, five television program data closer to the present time are displayed. In the figure, a black mark beside the program name "CDE DRAMA" to be broadcast on channel 8 from 20:00 to 21:00 on November 7 indicates that the contents of the program have been changed after the reservation setting.

After the five television program data reserved for recording have been displayed, it is determined whether or not the down scroll key has been turned on (S55). If the down scroll key has been turned on, another five television program data next closer to the present time than the displayed ones of the television program data registered in the reservation complete memory 32b will be displayed (S56).

When the determination at step S55 has shown that the operated key is not the down scroll key, control will proceed to step S57, where it will be determined whether or not the up scroll key has been turned on. If the up scroll key has been turned on, five television program data whose broadcasting start times are earlier than those of the television program data appearing on the display section 24 and the data indicating whether or not the contents of the programs have been changed will be displayed (S58).

When the determination at step S57 has shown that the operated key is not the up scroll key, control will proceed to step S59, where it will be determined whether or not the transparent key 4 has been turned on. If the transparent key 4 has been turned on, the one selected and specified using the transparent key 4 from the five television program data appearing on the display section 24 will be erased from the reservation complete memory 32b and the television program data stored next will be set closer in sequence (S60).

When the determination at step S59 has shown that the operated key is not the transparent key 4, control will proceed to step S61, where it will be determined whether or not the end key has been turned on. If the end key has been turned on, the process will be terminated. If the operated key is not the end key, control will return to step S55, where the process of judging the operated key will be repeated.

In the reservation verify mode, the user can cause the reserved television program data to be displayed in sequence and verify the contents of the reservation. Furthermore, when the programs reserved for recording are displayed, the information indicating the programs whose contents have been changed are displayed, enabling the user to confirm the television program data stored in the information memory 32, seeing the representation, and change the reservation, if necessary.

Next, a second embodiment of the present invention which enables remote control of a device to be controlled without using G codes will be explained by reference to FIGS. 15 to 17.

Although in the above embodiment, the case where the remote control device 1 has the function of transmitting G codes has been explained, some video apparatuses have no G-code reserving function. Taking this into account, in the second embodiment, the received television program data are converted into the remote control codes for the individual manufacturers and the resulting codes are transmitted.

Figure 4:
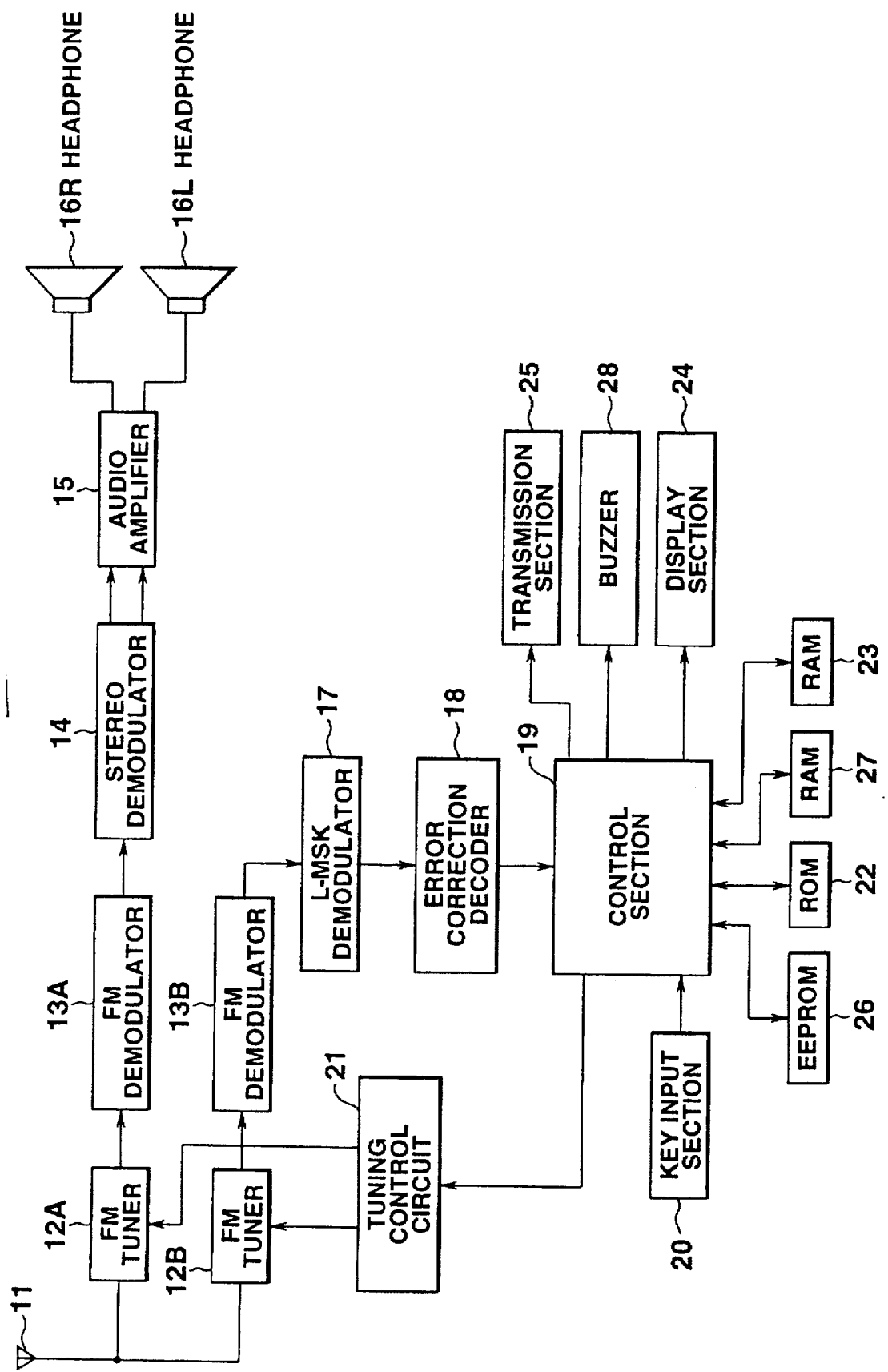
FIG. 4 is a circuit diagram of the remote control device.
Figure 15:
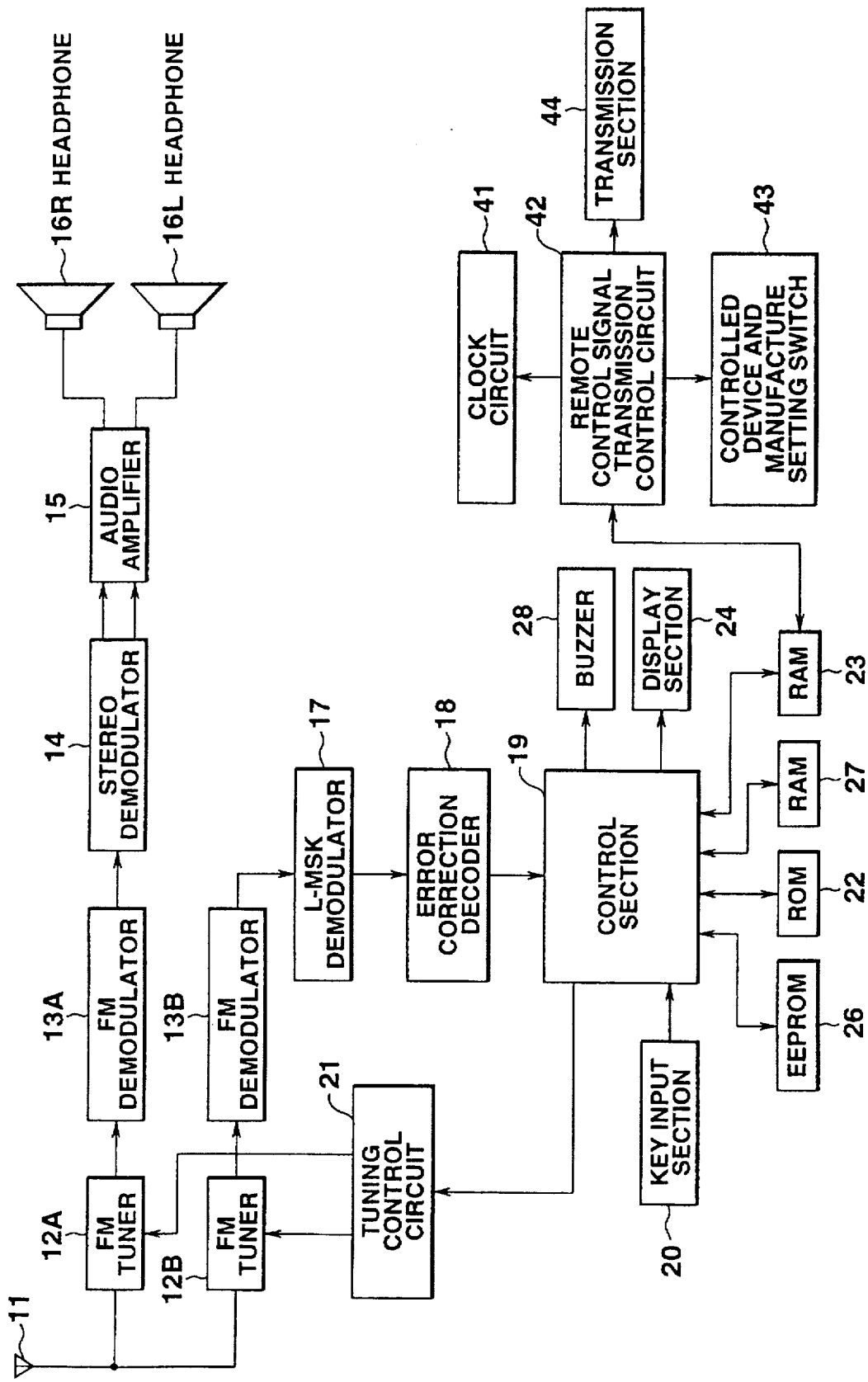
FIG. 15 is a circuit block diagram of a remote control device according to a second embodiment of the present invention.

In the circuit block diagram of FIG. 15, the same parts of the circuit of FIG. 4 of the first embodiment are indicated by the same reference symbols and explanation of those parts will not be given. In FIG. 15, a clock circuit 41 counts the clock signals generated by a clock generator circuit (not shown) and thereby clocks the time. The time data measured by the clock circuit 41 is outputted to a remote control signal transmission control circuit 42.

The remote control signal transmission control circuit 42 has the function of converting the television program data that has been chosen by the user from the television program data stored in the television program memory 32a and has been stored in the reservation complete memory 32b, into a remote control signal determined by the device to be controlled and its manufacturer and transmitting it to a transmission section 44. The transmission section 44 converts the remote control signal for the controlled videotape recorder outputted from the remote control signal transmission control circuit 42 into an infrared remote control signal and outputs the converted signal to the outside world.

A controlled device and manufacturer setting switch 43 is a switch for setting the type, serial number, and manufacturer of the video apparatus to be controlled. When the user sets these pieces of information, the remote control signal transmission control circuit 42 then produces a remote control signal suitable for the controlled videotape recorder or television set.

Hereinafter, the second embodiment will be described, centered on the portions where the second embodiment differs from the first embodiment, by reference to the flowcharts in FIGS. 16 and 17.

Figure 16:
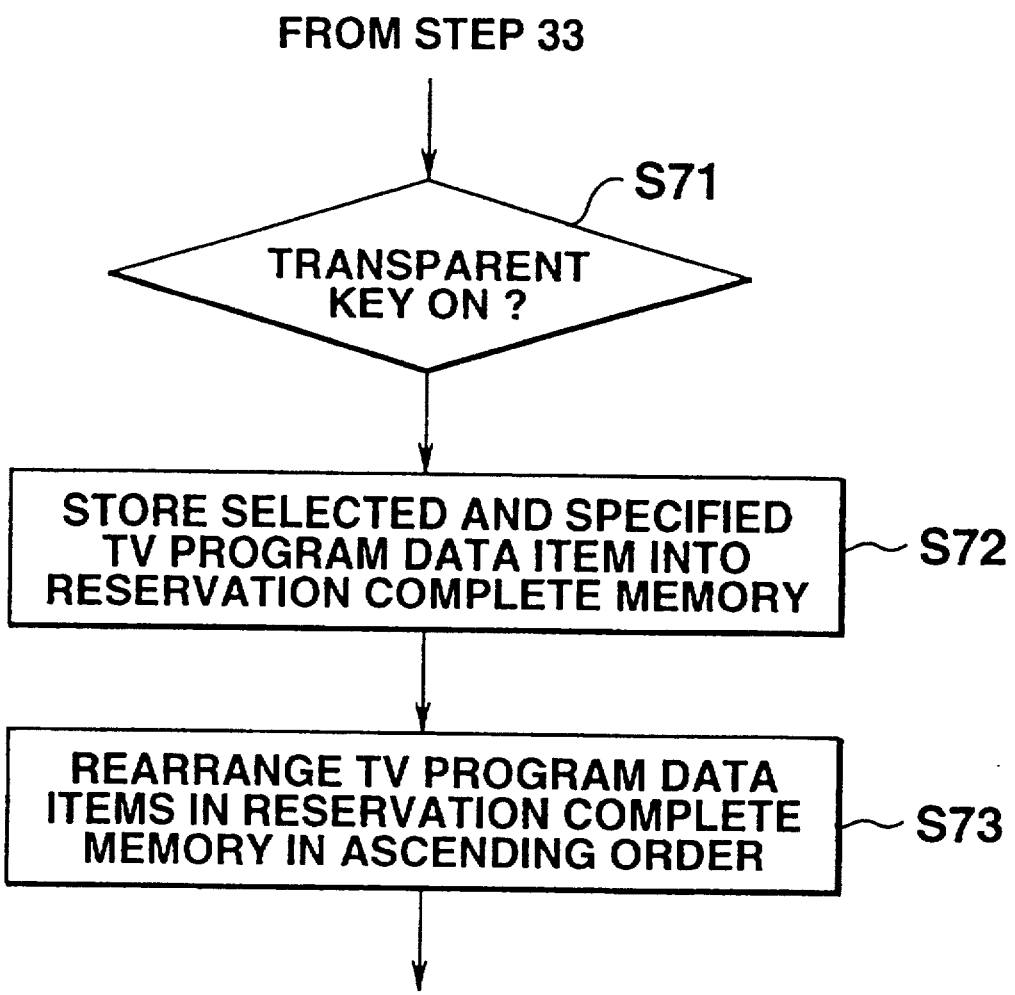
FIG. 16 is a flowchart showing the modified portions of the TV program reservation mode process in the remote control device according to the second embodiment.

FIG. 16 is a flowchart for only the portions differing from the TV program reservation mode process of FIG. 12.

In the second embodiment, instead of step S34 to step S37 in FIG. 12, the processes in step S71 to step S73 of FIG. 16 will be executed.

Specifically, when the date and channel are specified and the transparent key 4 is turned on with five program data displayed (step S71, YES, in FIG. 16), the television program data chosen and specified using the transparent key 4 is stored in the reservation complete memory 32b (step S72). At this time, the television program data chosen and specified, that is, the data including the broadcasting date, channel, broadcasting start and end times, etc., are stored in the reservation complete memory 32b. Thereafter, the reservation data stored in the reservation complete memory 32b are rearranged in ascending order of broadcasting start time (step S73).

Next, the contents of the process in transmitting the remote control signal to the videotape recorder after the user has reserved a television program on the remote control device 1 of the second embodiment will be explained by reference to the flowchart of FIG. 17.

Figure 17:
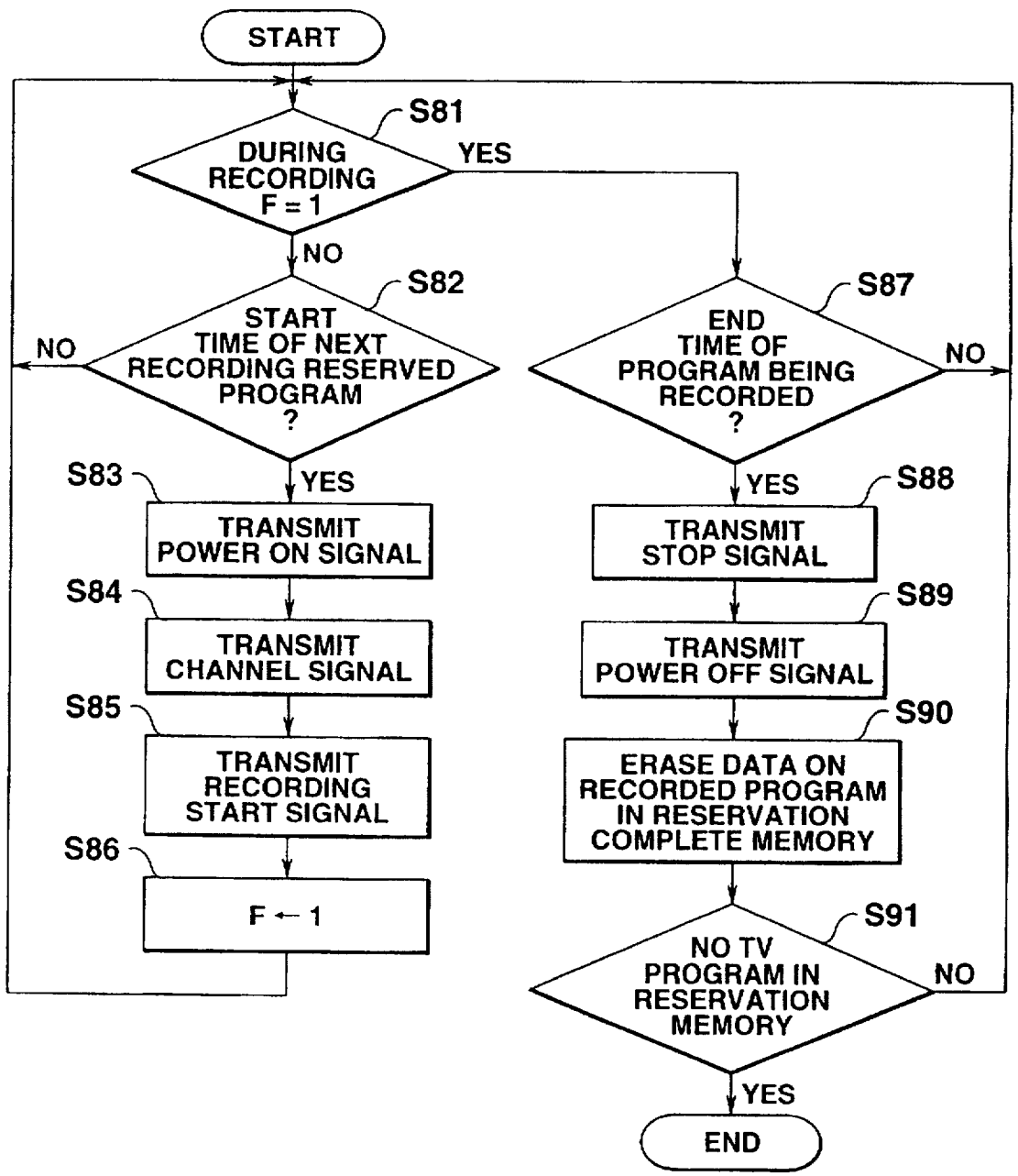
FIG. 17 is a flowchart for the remote control code transmitting process in the remote control device of the second embodiment.

First, depending whether the recording flag F is at "1," it is determined whether or not the videotape recorder is now recording (step S81 in FIG. 17). The recording flag F is a flag that indicates whether or not the program reserved by the user is now being recorded. The recording flag F is set at "1" when the start time of the television program registered in the reservation memory 32b is compared with the present time counted at the clock circuit 41 and it is found that there is a program whose broadcasting start time has exceeded the present time but whose broadcasting end time has not been reached. In the other cases, the recording flag F is at "0."

When the recording flag F=1, or recording is now not in progress, control will proceed to step S82, where it will be determined whether or not the start time of the next recording reserved program registered in the reservation complete memory 32b has been reached. When the present time has reached the start time of the next recording reserved program, the transmission section 44 transmits a power on signal that turns on the videotape recorder (S83). In addition, it transmits a signal that specifies the channel for the next recording reserved program (S84). Then, it transmits a recording start signal (S85), sets the recording flag F at "1" (S86), and returns control to step S81.

When at step S81, it has been determined that the recording flag F is at "1," control will proceed to step S87, where it will be determined whether or not the current time has reached the end time of the program being recorded. If the present time has reached the end time, the transmission section 44 transmits a recording stop signal (S88) and further a power off signal that turns off the power supply of the videotape recorder (S89). Then, the television program data on the recorded program are erased from the reservation complete memory 32b (S90). A check is made to see if another television program has been registered in the reservation complete memory 32b. If another television program has been registered, control will be returned to step S81, from which the above-described processes will be repeated If another television program has not been registered in the reservation complete memory 32b, the process will be terminated.

With the second embodiment, a videotape recorder that does not have the function of recording in G codes or a television set controlled by a remote control signal differing from manufacturer to manufacturer can be controlled on the basis of the received television program data.

For instance, the received television program data are stored in the storage section in the remote control device 1. The stored television program data are displayed and the user selects the program the user wants to see from the displayed items. Then, when the broadcasting start time has been reached, the remote control device transmits a power on signal and a channel signal for specifying the channel on which the program is broadcast to the videotape recorder or television set. Therefore, even if the user forgets the broadcasting time of the program, the power supply of the videotape recorder or television set will be turned on automatically at the broadcasting start time, enabling the user to see the program. Furthermore, even with a videotape recorder with a recording reservation function, a television program the user wants to see can be recorded or seen without setting the recorder in the recording reservation state.

While in the above embodiment, the case where the program information is transmitted through FM multiplex broadcasting has been explained, the present invention is not limited to FM broadcasting but may be applied to a case where the television program data are multiplexed with television broadcasting radiowaves and the multiplexed signals are transmitted.

Furthermore, while in the above embodiment, two FM tuners are used to enable ordinary FM broadcasts to be received even when multiplex information is being received, only one FM tuner may be used to enable either FM broadcast or multiplex information to be received.

Still furthermore, the present invention is not restricted to a special device for the remote control device, but may be applied to a device also serving as a small electronic apparatus, such as an electronic calculator or electronic notebook.

Figure 18:
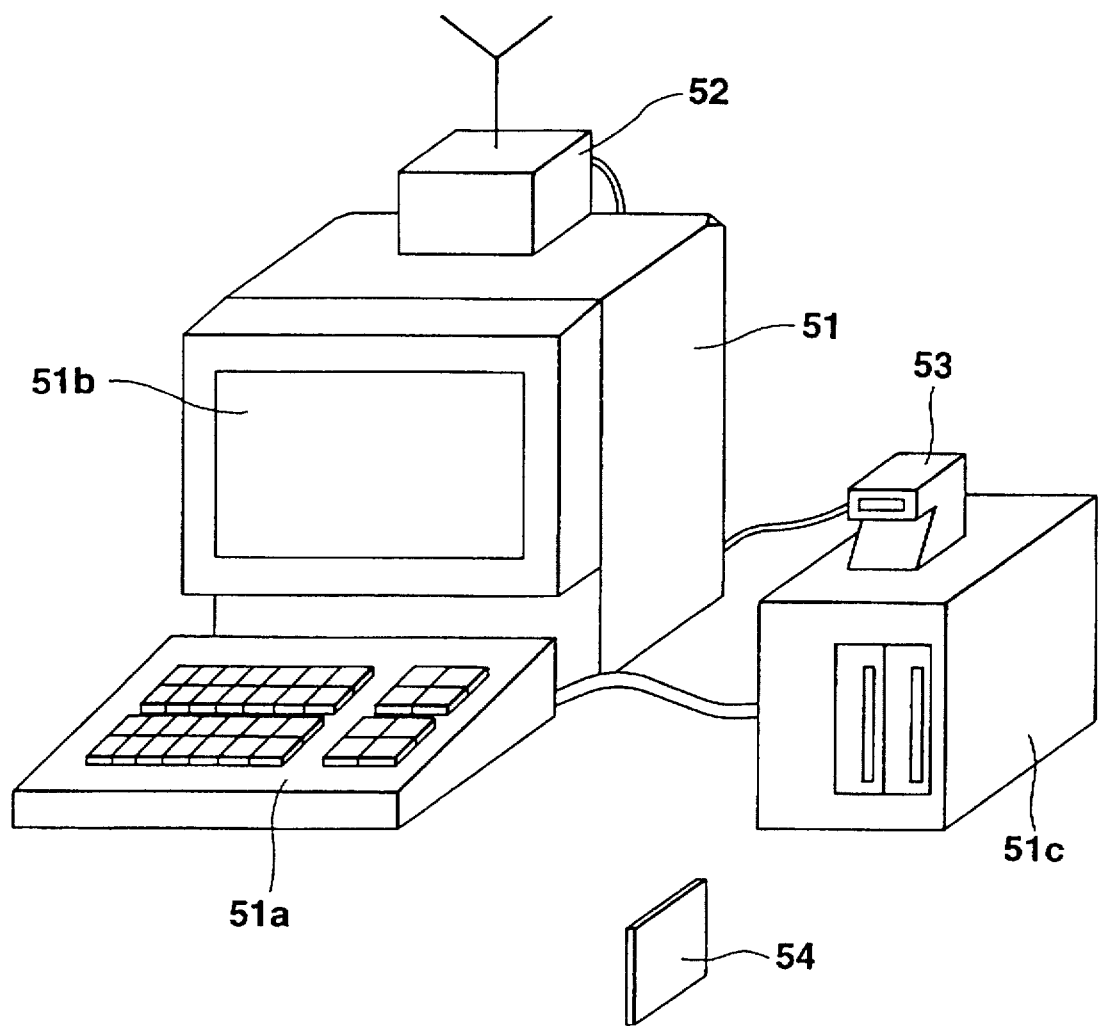
FIG. 18 illustrates a case where the present invention is applied to a personal computer.

As shown in FIG. 18, the present invention is also realized as follows. An FM multiplex broadcasting transmission/reception unit 52 and an infrared transmission unit 53 are connected to a personal computer 51 having a keyboard 51a, a display 51b, and a floppy disk reading unit 51c. The program codes that control the personal computer 51, FM multiplex broadcasting transmission/reception unit 52, and infrared transmission unit 53 are stored in a floppy disk 54. The floppy disk reading unit 51c reads the program codes on the floppy disk 54. According to the read-out program codes, the personal computer 51, FM multiplex transmission/reception unit 52, and infrared transmission unit 53 are controlled, thereby realizing the invention.

In this case, the FM multiplex broadcasting transmission/reception unit 52 corresponds to the antenna 11, FM tuner 12B, FM demodulator 13B, L-MSK demodulator 17, error correction decoder 18, and tuning control circuit 21; the infrared transmission unit 53 corresponds to the transmission section 25 of FIG. 4; the floppy disk 54 corresponds to the ROM 22 of FIG. 4; and the personal computer 51 corresponds to the control section, key input section 20, display section 24, RAMs 23 and 27, and EEPROM 26.

I claim:
1. A remote control device independently provided from a to-be-controlled unit, comprising:
   a receiver which receives a plurality of broadcasting program data and corresponding remote control codes;
   a memory which stores said plurality of broadcasting program data and remote control codes received by the receiver;

a display which displays the plurality of broadcasting program data;

a program specifying switch which specifies a desired one of the plurality of broadcasting program data displayed by the display; and a transmitter which radio-transmits the remote control code of the broadcasting program data specified by the program specifying switch to the to-be-controlled unit when a desired one of the broadcasting program data is designated by said program specifying switch.

2. A remote control device according to claim 1, further comprising:

specified program storage means for storing the desired broadcasting program data specified by said program specifying means; and display means for displaying the desired broadcasting program data stored in said specified program storage means.

3. A remote control device according to claim 1, further comprising:

specified program storage means for storing the desired broadcasting program data specified by said program specifying means;

determination means for determining whether or not a change has been made in said desired broadcasting program data, on the basis of the broadcasting program data received by said reception means after the desired broadcasting program data has been stored in said specified program storage means; and notifying means for giving notice when the determination means has determined that a change has been made.

4. A remote control device according to claim 1, wherein said remote control code is a data obtained by encoding the channel data, date data, time data, and duration data of a broadcasting program and compressing the encoded data.

5. A remote control device according to claim 1, wherein said broadcasting program data and remote control codes are multiplexed with FM radio broadcasting radiowaves and then transmitted, and said reception means includes means for receiving FM radio broadcasting radiowaves and extracting said multiplexed broadcasting program data and remote control codes.

6. A remote control method for remote-controlling a to-be-controlled unit with a remote control device independently provided therefrom, comprising the steps of:

receiving a plurality of broadcasting program data and corresponding remote control codes;

storing the received plurality of broadcasting program data and remote control codes;

displaying the stored plurality of broadcasting program data on a display;

specifying a desired one of said displayed plurality of broadcasting program data; and radio-transmitting the remote control code of the specified broadcasting program data to the to-be-controlled unit when the desired one of the broadcasting program data is designated.

7. A remote control method according to claim 6, further comprising the steps of:

storing the specified desired broadcasting program data into specified program storage means; and displaying the desired broadcasting program data stored in said specified program storage means.

8. A remote control method according to claim 6, further comprising the steps of:

storing said specified desired broadcasting program data into specified program storage means;

determining whether or not a change has been made in the desired broadcasting program data, on the basis of the broadcasting program data received after the desired broadcasting program data has been stored in said specified program storage means; and giving notice when it has been determined that a change has been made.

9. A remote control method according to claim 6, wherein said remote control code is a data obtained by encoding the channel data, date data, time data, and duration data of a program and compressing the encoded data.

10. A remote control method according to claim 6, wherein said broadcasting program data and remote control codes are multiplexed with FM radio broadcasting radiowaves and then transmitted.

11. A program storage medium comprising:

computer-readable program instruction means for instructing a remote control device to receive a plurality of broadcasting program data and corresponding remote control codes;

computer-readable program instruction means for instructing the remote control device to store the received plurality of broadcasting program data and remote control codes;

computer-readable program instruction means for instructing the remote control device to display the plurality of stored program data;

computer-readable program instruction means for instructing the remote control device to specify a desired one of the displayed plurality of broadcasting program data; and computer-readable program instruction means for instructing the remote control device to radio-transmit the remote control code of the specified broadcasting program data to the to-be-controlled unit when the desired program data is designated.

12. A program storage medium according to claim 11, further comprising:

computer-readable program instruction means for instructing the remote control device to store said specified desired broadcasting program data into a specified program storage means; and computer-readable program instruction means for instructing the remote control device to display the desired broadcasting program data stored in said specified program storage means.

13. A program storage medium according to claim 11, further comprising:

computer-readable program instruction means for instructing the remote control device to store the specified desired broadcasting program data into said specified program storage means;

computer-readable program instruction means for instructing the remote control device to determine whether or not a change has been made in the desired broadcasting program data, on the basis of the broadcasting program data received after the desired broadcasting program data has been stored in the specified program storage means; and computer-readable program instruction means for instructing the remote control device to give notice when it has been determined that a change has been made.

14. A program storage medium according to claim 11, wherein said remote control code is a data obtained by encoding the channel data, date data, time data, and duration data of a program and compressing the encoded data.

15. A program storage medium according to claim 11, wherein said broadcasting program data and remote control codes are multiplexed with FM radio broadcasting radiowaves and then transmitted.

* * * * *